US012652328B2

(12) United States Patent　　(10) Patent No.: US 12,652,328 B2

Sodagar　　(45) Date of Patent: Jun. 9, 2026

(54) PROCESSING MODEL FOR DASH CLIENT PROCESSING MODEL TO SUPPORT HANDLING OF DASH EVENT REPEATS

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 23 days.

(21) Appl. No.: 18/765,907

(22) Filed: Jul. 8, 2024

(65) Prior Publication Data

US 2025/0023935 A1　Jan. 16, 2025

Related U.S. Application Data

(60) Provisional application No. 63/526,157, filed on Jul. 11, 2023.

(51) Int. Cl.
H04L 65/65 (2022.01)
H04L 67/02 (2022.01)

(52) U.S. Cl.
CPC .............. H04L 65/65 (2022.05); H04L 67/02 (2013.01)

(58) Field of Classification Search
CPC ................................ H04L 65/65; H04L 67/02
See application file for complete search history.

(56) References Cited

U.S. PATENT DOCUMENTS 10,938,872 B2 * 3/2021 Lo ...................... H04N 21/8456
11,973,815 B2 * 4/2024 Szucs ..................... H04L 67/02

12,088,652 B2 * 9/2024 Stockhammer .. H04N 21/64322
2014/0013003 A1 1/2014 Giladi
2015/0319214 A1 11/2015 Yu et al.
2022/0217188 A1 7/2022 Sodagar
2022/0353317 A1 * 11/2022 Wang ................. H04N 21/4307
2023/0008757 A1 * 1/2023 Shribman ............. H04L 65/612

OTHER PUBLICATIONS

International Search Report dated Oct. 10, 2024 in Application No. PCT/US2024/037511.
Written Opinion of the International Searching Authority Dated Oct. 10, 2024 in International Application No. PCT/US2024/037511.
"Information technology—Dynamic adaptive streaming over HTTP (DASH)—Part 1: Media presentation description and segment formats," International Standard, ISO/IEC 23009-1:2022(E), ISO/IEC JTC 1/SC 29/WG 3, 2022, pp. 1-320.
"Text of ISO/IEC 23009-1 5th edition CDAM 2 EDRAP streaming, content steering and other extensions," KATS, ISO/IEC JTC 1/SC 29/WG 03, N0780, 2023, 38 pages.

* cited by examiner

*Primary Examiner* — Nazia Naoreen
(74) *Attorney, Agent, or Firm* — Sughrue Mion, PLLC

(57) ABSTRACT

There is included a method and apparatus comprising computer code configured to cause a processor or processors to obtain identifier values of a plurality of events of a media file in DASH, determine whether ones of the identifier values of the plurality of events having a same value, dispatch, from the DASH client and to a DASH application, a first DASH event of the plurality of events, wherein dispatching the first DASH event having also dispatching together the first DASH event and a second DASH event of the plurality of events based on determining that the second DASH event is scheduled to be dispatched and having the same value as the first DASH event, and control the DASH application based on dispatching at least the first DASH event and the second DASH event.

14 Claims, 12 Drawing Sheets

```
aligned(8) class DASHEventMessageBox extends FullBox('emsg', version, flags){
  if (version==0) {
    string          scheme_id_uri;
    string          value;
    unsigned int(32) timescale;
    unsigned int(32) presentation_time_delta;
    unsigned int(32) event_duration;
    unsigned int(32) id;
  } else if (version==1) {
    unsigned int(32) timescale;
    unsigned int(64) presentation_time;
    unsigned int(32) event_duration;
    unsigned int(32) id;
    string          scheme_id_uri;
    string          value;
  }
  unsigned int(8) message_data[];
}
```

S901 dispatch_mode on start

Figure 9:
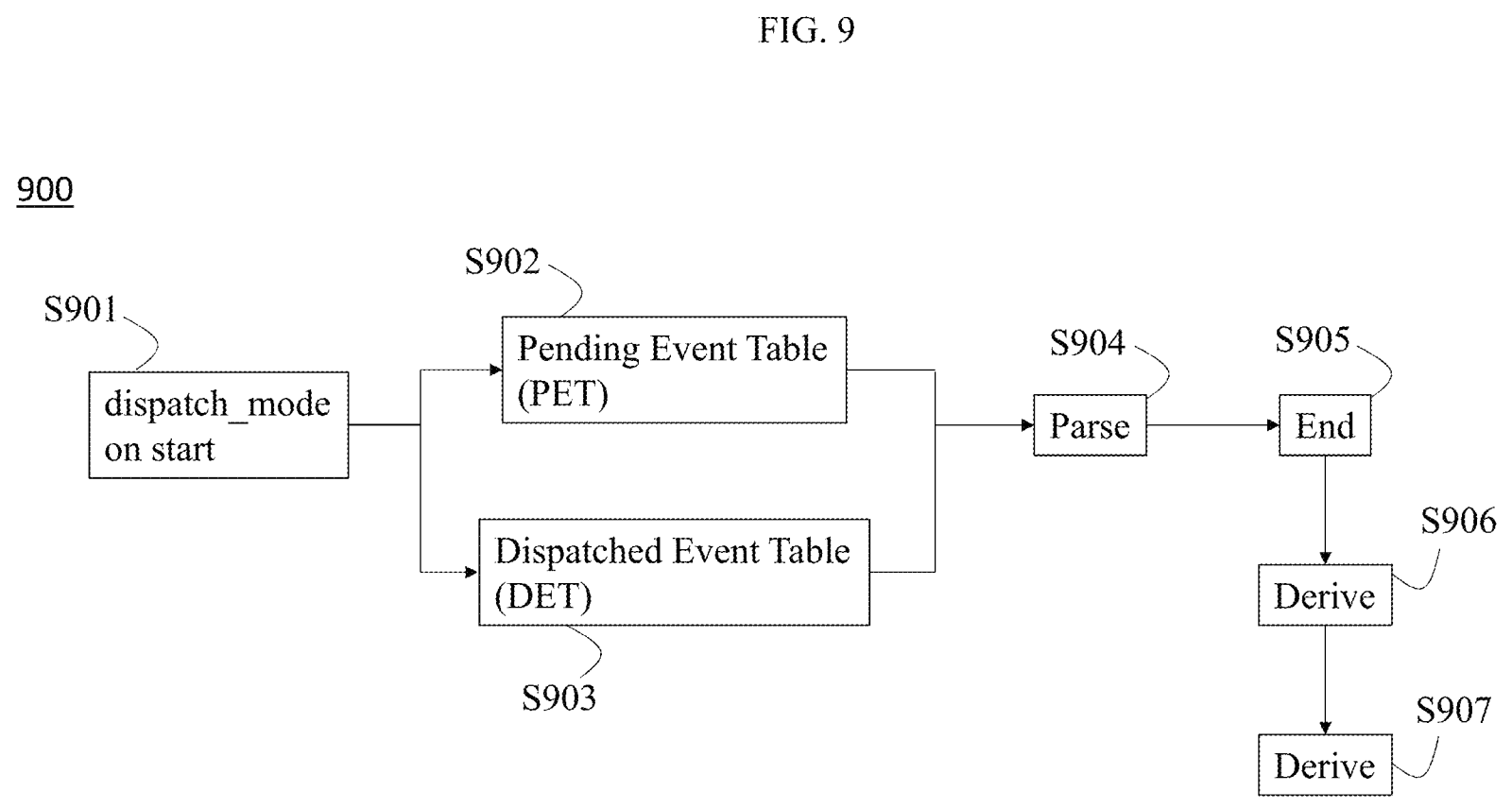

S902

Pending Event Table (PET)

S903

Dispatched Event Table (DET)

S904

Parse

S905

End

S906

Derive

S907

Derive

1100 dispatch_mode on_start — S1101 update — S1102

Remove — S1103 derive — S1104 time < ST — S1105 end — S1106 derive — S1107 time < ET — S1108 event — S1109 id — S1110 add — S1111 dispatch — S1112

PROCESSING MODEL FOR DASH CLIENT PROCESSING MODEL TO SUPPORT HANDLING OF DASH EVENT REPEATS

CROSS REFERENCE TO RELATED APPLICATION

The present application claims priority to provisional application U.S. 63/526,157, filed on Jul. 11, 2023 the contents of which is hereby expressly incorporated by reference, in its entirety, into the present application.

BACKGROUND

1. Field

This disclosure provides a processing model for the dash client to process repeated DASH events.

2. Description of Related Art

ISOBMFF is a widely used file format for media content. The CMAF standard defines common media format tracks that can be grouped as switching sets. The CMAF switching sets are used for delivering media with alternative tracks. The alternative tracks represent the same content but they have different attributes such as bitrate, resolution, frame rate, and other possible characteristics.

ISO/IEC 23009-1 DASH standard allows the streaming of multi-rate content. The spec includes carriage of MPD and inband events and has a client processing model for these events.

MPEG DASH provides a standard for streaming multimedia content over IP networks. Recently, it considered adding a mechanism to signal updated events. However, repeated events are undefined as is any a processing model therefor.

And for any of those reasons there is therefore a desire for technical solutions to such problems that arose in computer audio technology.

SUMMARY

To address those technical problems, there is included a method and apparatus comprising memory configured to store computer program code and a processor or processors configured to access the computer program code and operate as instructed by the computer program code. The computer program is configured to cause the processor or processors to implement, for a dynamic adaptive streaming over hypertext transfer protocol (HTTP) (DASH) application implemented by the processor or processors, obtaining code configured to cause the at least one processor to obtain identifier values of a plurality of events of a media file in DASH; determining code configured to cause the at least one processor to determine whether ones of the identifier values of the plurality of events comprise a same value; dispatching code configured to cause the at least one processor to dispatch, from the DASH client and to a DASH application, a first DASH event of the plurality of events, wherein dispatching the first DASH event comprises also dispatching together the first DASH event and a second DASH event of the plurality of events based on determining that the second DASH event is scheduled to be dispatched and comprises the same value as the first DASH event; and controlling code configured to cause the at least one processor to control the DASH application based on dispatching at least the first DASH event and the second DASH event.

The same value may include at least one of a scheme and an identifier in DASH.

Dispatching the first DASH event together with the second DASH event may include dispatching the second DASH event with a syntax "@status=repeat".

The syntax "@status=repeat" may be provided by the DASH client as an indication of a media presentation description (MPD) repeated event.

Dispatching the first DASH event together with the second DASH event may include dispatching the second DASH event with an emsg box with a flag syntax of "& 2=1".

Dispatching the first DASH event together with the second DASH event may include dispatching the second DASH event with the emsg box with the flag syntax of "& 2=1" is provided by the DASH client as an indication of an inband repeated event.

The same value may be at least a "scheme_id_uri" syntax.

BRIEF DESCRIPTION OF THE DRAWINGS

Further features, nature, and various advantages of the disclosed subject matter will be more apparent from the following detailed description and the accompanying drawings in which:

FIG. 3 is a simplified block diagram regarding decoders in accordance with embodiments;

FIG. 4 is a simplified block diagram regarding encoders in accordance with embodiments;

FIG. 7 is a simplified illustration regarding event message features in accordance with embodiments;

FIG. 8 is a simplified flow diagram in accordance with embodiments;

FIG. 9 is a simplified flow diagram in accordance with embodiments;

FIG. 11 is a simplified flow diagram in accordance with embodiments; and

FIG. 12 is a simplified block diagram of a computer environment in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
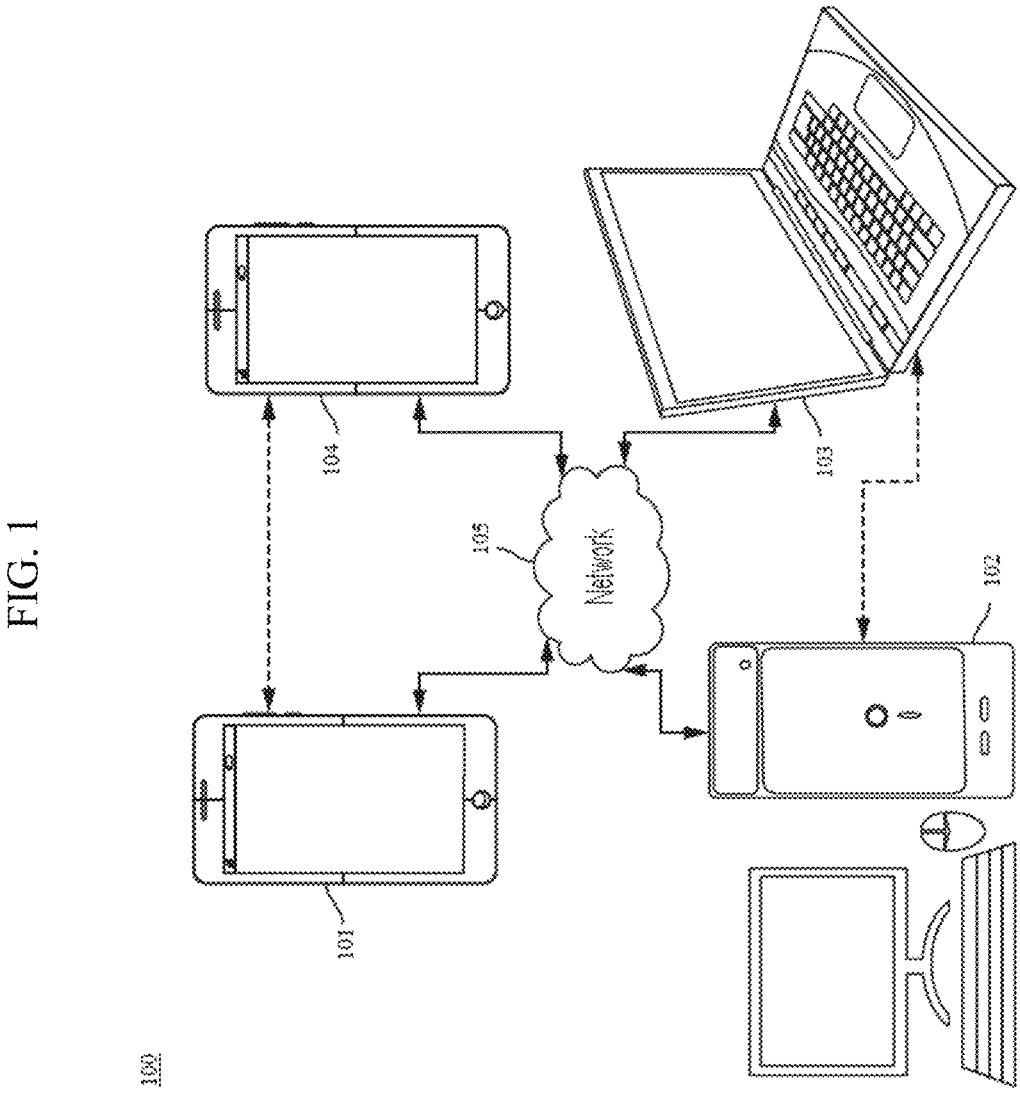
FIG. 1 is a simplified schematic illustration of a computer environment in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
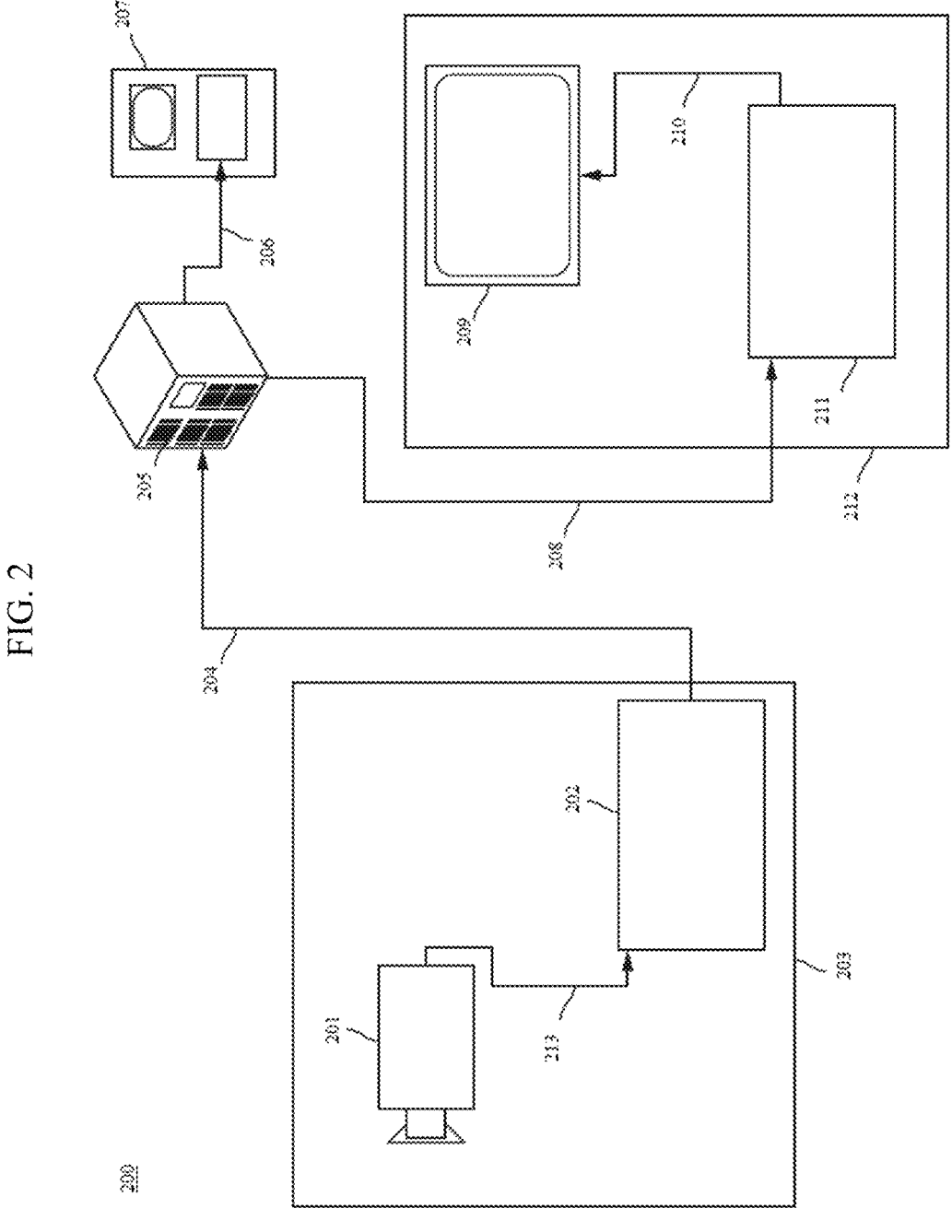
FIG. 2 is a simplified schematic illustration of media processing in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
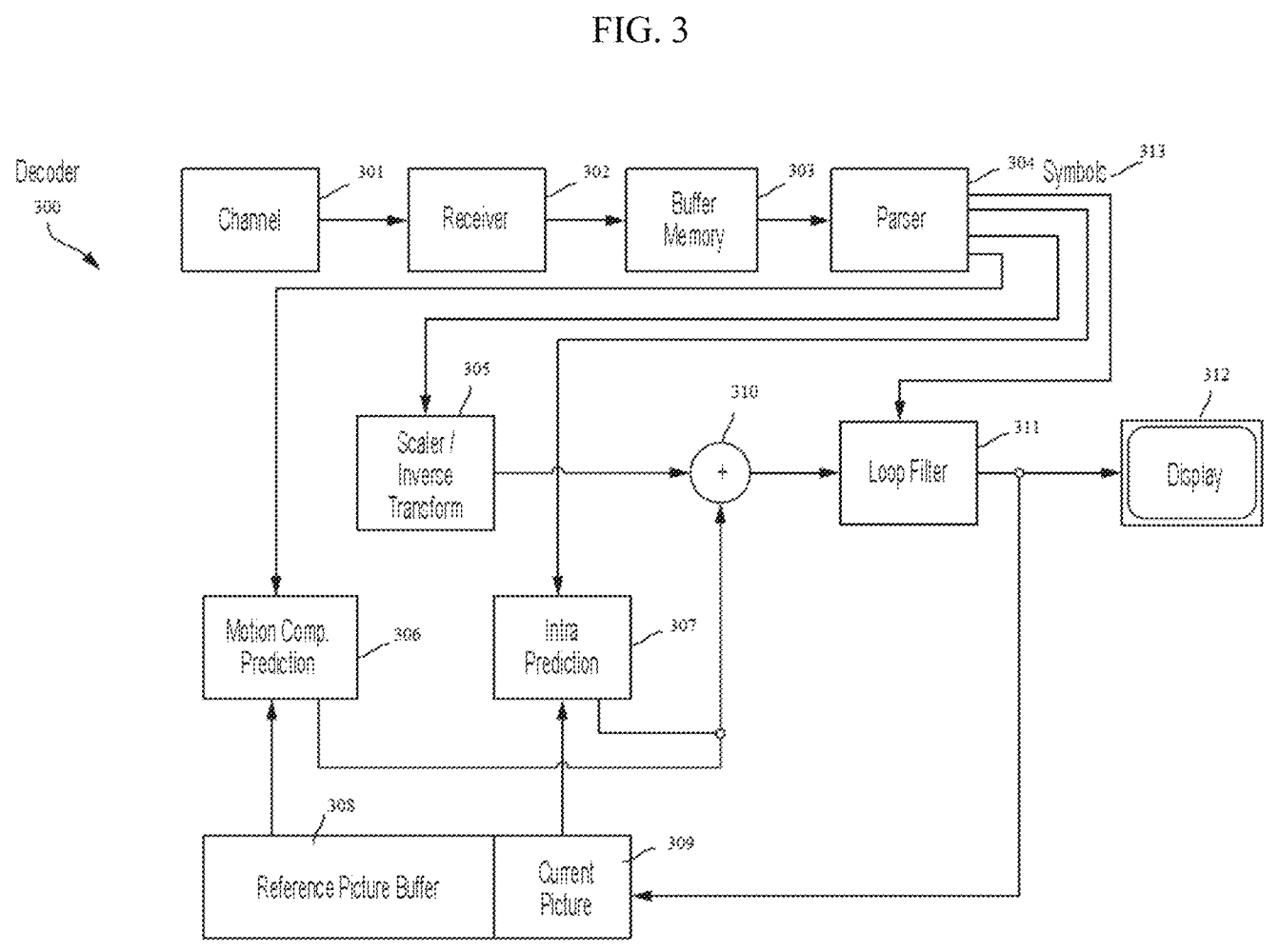

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
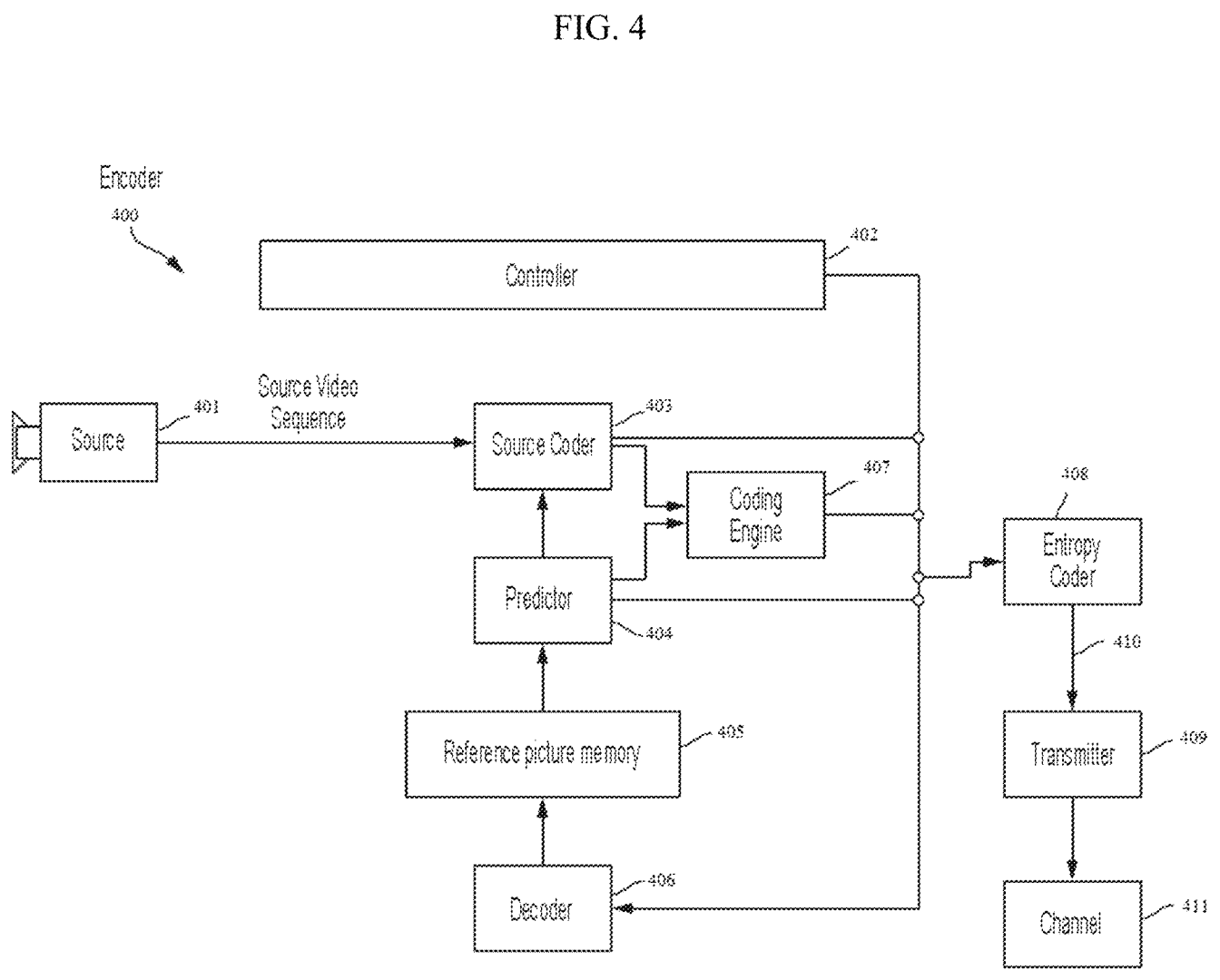

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
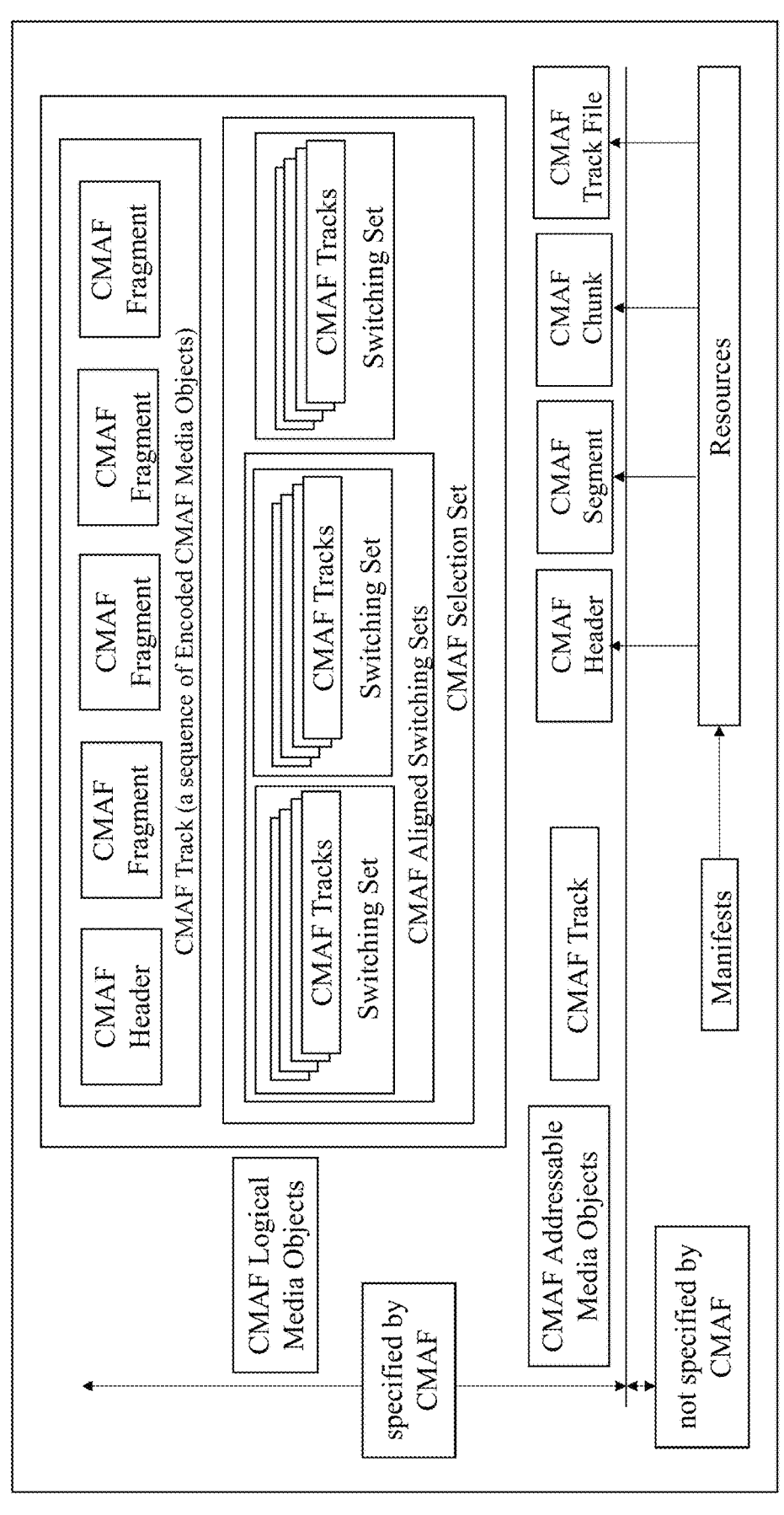
FIG. 5 is a simplified block diagram regarding common media application format (CMAF) features in accordance with embodiments.

FIG. 5 shows an example 500 of the CMAF tracks and CMAF switching sets defined by CMAF, such as with ISO/IEC JTC 1/SC 29/WG03 N00654 or the like, according to exemplary embodiments. A CMAF switching is a set of CMAF tracks that have some common constraints. The main purpose of a CMAF switching set is to provide alternate representations of the same content in multiple tracks so that during the delivery or playback, the player can switch between tracks to accommodate the network bandwidth variation and other varying properties. The CMAF standard uses ISOBMFF for the track formats, but it does not provide a standard to signal the existence of a CMAF switching set in the ISOBMFF file.

Embodiments herein introduce a new version of the ISOBMGG track selection box with unique properties. This new box contains several parameters to signal a CMAF switching set and its properties.

According to embodiments, there is a version 1 switchin group which may (i) use switching group id to identify this group, (ii) alternate group id (for selection list), (iii) have switchable group id, (iv) track group id for preselection associations, and (v) indicate CMAF parameters.

Embodiment herein provide the following definition:
Box type: 'tsel'
Container: UserDataBox of the corresponding TrackBox
Mandatory: No
Quantity: Zero or One
Such track selection box is contained in the user data box of the track it modifies.

Figure 6:
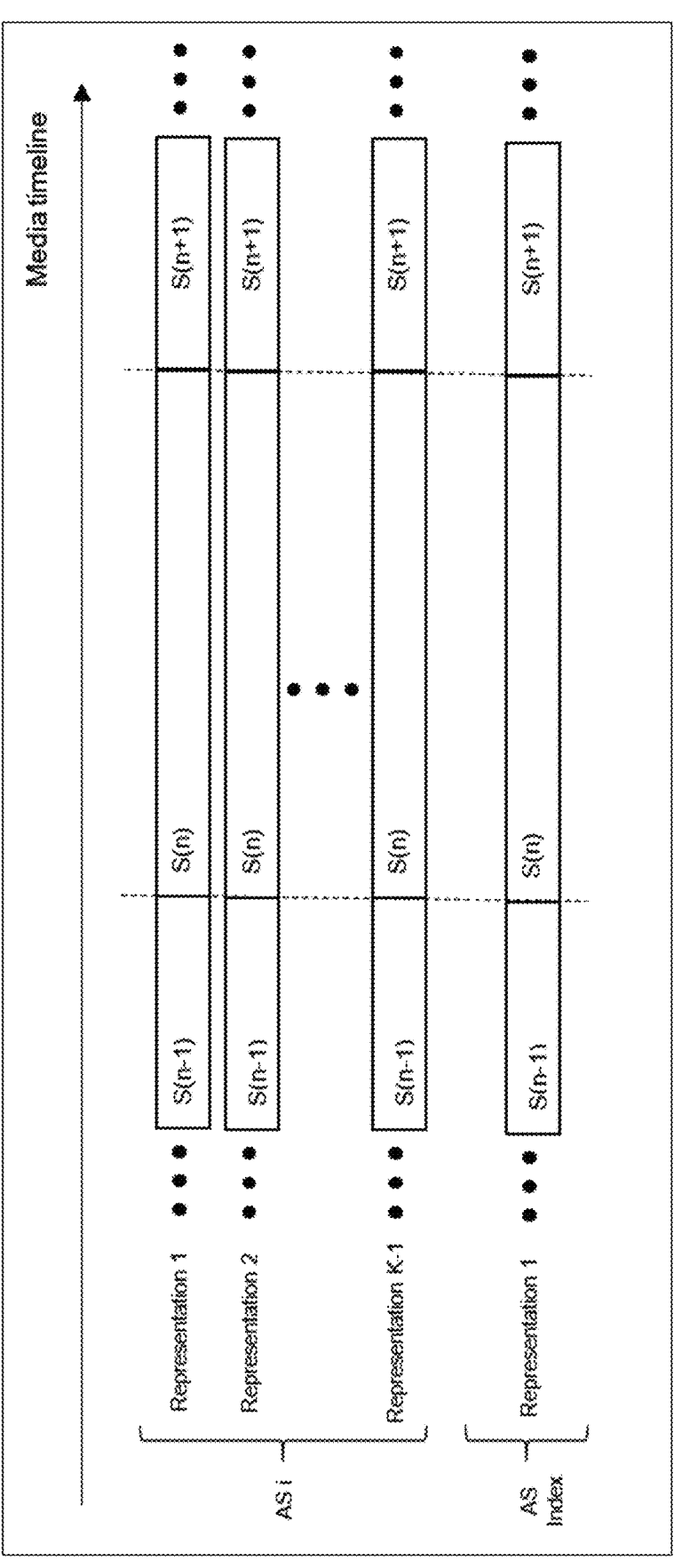
FIG. 6 is a simplified block diagram regarding a Dynamic Adaptive Streaming over HTTP (DASH) environment in accordance with embodiments.

FIG. 6 shows an example 600 for a sample of a metadata track for adaptation set segment indexing such as for any given adaptation set. For example, for each adaptation set (AS) that the instantaneous segment bandwidth is expected to be signaled, a separate adaptation set may also be included in the manifest, as shown in FIG. 6.

As shown in FIG. 6, for an AS i with k media representation that their segments are timed aligned, a new adaptation set AS index is added to the manifest that contains a single representation. This single representation is a timed metadata track that its segments are also timed aligned with the segments of the AS i representations.

Figure 7:
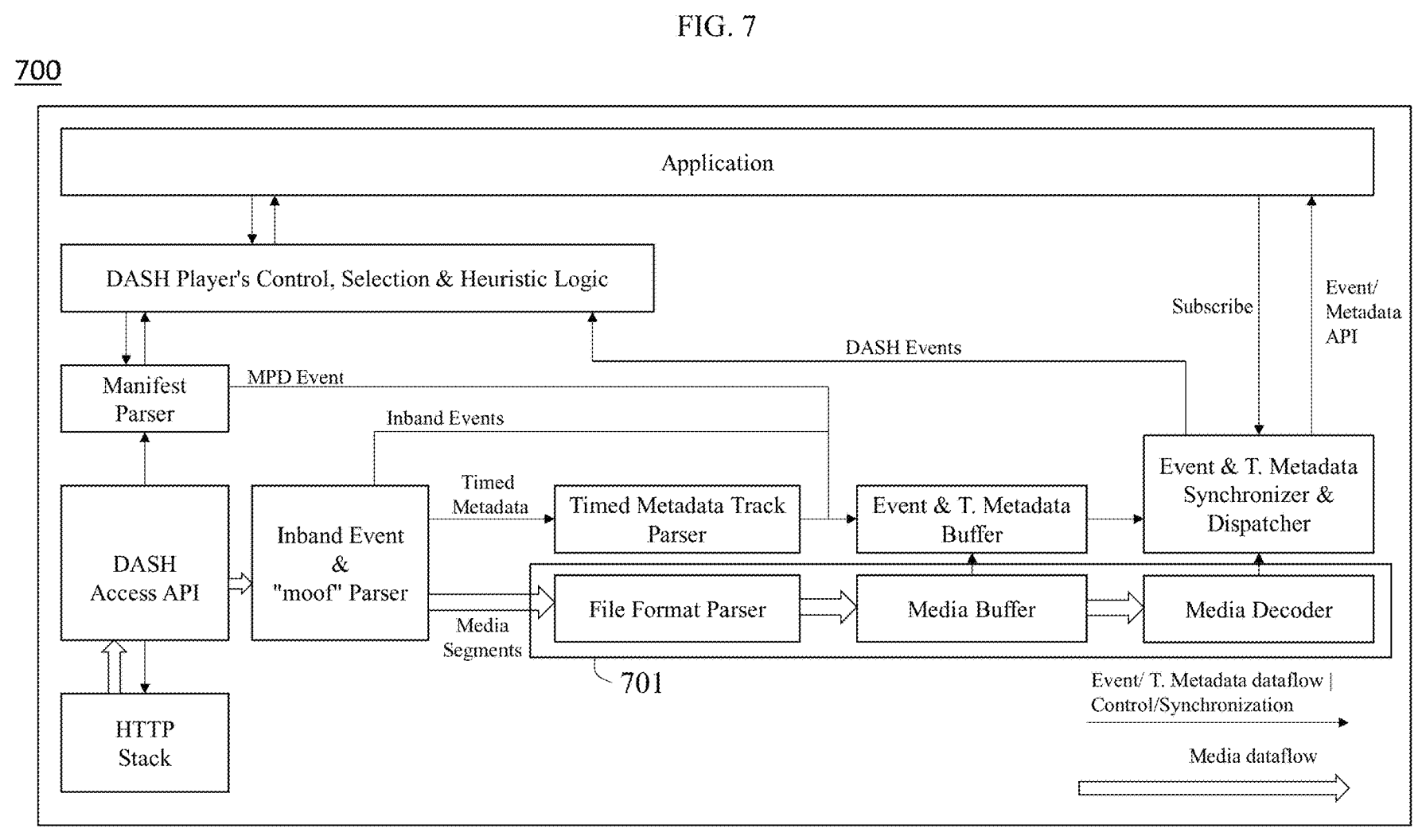

FIG. 7 shows a sample DASH client processing model 700, such as of a client sample architecture for processing DASH and Common Media Application Format (CMAF) events, in which a client request of media segments may be based on described addresses in a manifest which also described metadata tracks from which a client may access segments of metadata tracks, parse them, and send them to an application. Further, according to exemplary embodiments, of addresses for media segments such as described below, a DASH manifest may provide addressed for Index segments. Each index segment may provide information about one segment duration and size, and a Representation Index may provide the index information for all segments of a given representation.

As with FIG. 7, a client requests the media segments based on the described addresses in the manifest, and as shown in the lower part 701 of the example model 700, the MSE buffer consists of the pipeline of a file format parser, a media buffer, and a media decoder. And exemplary embodiments employ the MPD and inband updated events using the following attributes and flags as in Table 1:

TABLE 1

| Event Semantics | | |
| --- | --- | --- |
| Element or Attribute Name | Use | Description |
| Event | | specifies an Event and contains the message of the event. The content of this element depends on the event scheme. The contents shall be either: A string, optionally encoded as specified by @contentEncoding XML content using elements external to the MPD namespace For new event schemes string content should be used, making use of Base 64 encoding if needed. |

TABLE 1-continued

| Event Semantics | | |
|---|---|---|
| Element or Attribute Name | Use | Description |
| | | NOTE The schema allows "mixed" content within this element however only string data or XML elements are permitted by the above options, not a combination. |
| @presentationTime | OD default: 0 | specifies the presentation time of the event relative to the start of the Period taking into account the @presentation TimeOffset of the Event Stream, if present. The value of the presentation time in seconds is the division of the value of this attribute and the value of the @timescale attribute. If not present, the value of the presentation time is 0. |
| @duration | O | specifies the presentation duration of the Event. The value of the duration in seconds is the division of the value of this attribute and the value of the @timescale attribute. The interpretation of the value of this attribute is defined by the scheme owner. If not present, the value of the duration is unknown. |
| @id | O | specifies an identifier for this instance of the event. Events with equivalent content and attribute values in the Event element shall have the same value for this attribute. The scope of the @id for each Event is with the same @schemeIdURI and @value pair. |
| @status | O default: none | specifies the status of event: none: no specific status update: the event is an update of event with identical values of @schemeIdUr, @value, and @id |
| @contentEncoding | O | specifies whether the information in the body and the information in the @messageData is encoded. If present, the following value is possible: base64 the content is encoded as described in IETF RFC 4648 prior to adding it to the field. If this attribute is present, the DASH Client is expected to decode the message data and only provide the decoded message to the application. |
| @messageData | O | specifies the value for the event stream element. The value space and semantics must be defined by the owners of the scheme identified in the @schemeIdUri attribute. NOTE the use of the message data is discouraged by content authors, it is only maintained for the purpose of backward-compatibility. Including the message in the Event element is recommended in preference to using this attribute. This attribute is expected to be deprecated in the future editions of this document. |

Key

For attributes: M = mandatory, O = optional, OD = optional with default value, CM = conditionally mandatory For elements: <minOccurs> . . . <maxOccurs> (N = unbounded)

Elements are bold; attributes are non-bold and preceded with an @.

According to example embodiments, an Event with @status='update' is the updated instance of an earlier event with identical @schemeIdUri, @value, and @id attributes that may have been previously processed by the DASH client. The DASH client may replace the previous event with the updated instance if the previous event has not been dispatched yet. An Event with @status='update' may differ from the previous event except in the following attributes: @schemeIdUri, @value, and @id. See the example 800 of FIG. 8 for example. The flags field is specified as follows:

(flags & 1) equal to 1 indicates that the esmg is an update of another esmg with identical values of scheme_id_uri, value, and id fields.

Examplary embodiments provide for repeated events as an "MPD repeated event" is an An Event with @status='repeat' is the repeated instance of an earlier event with identical @schemeIdUri, @value, and @id attributes that may have been previously processed by the DASH client; even if the DASH client has dispatched the earlier event, it should dispatch the repeated event. And an "Inband repeated event" is an emsg box with flags & 2=1 is the repeated instance of an emsg box with identical scheme_id_uri, value, and id fields that may have been previously processed by the DASH client; even if the DASH client has dispatched the earlier event, it should dispatch the repeated event.

The above statements defines a precise definition of repeated events, examinable by the DASH client and therefore they can be detected without any ambiguities.

The following Table 2 provides examples for signaling the repeated event by the following syntax is used for signaling the repeated events.

TABLE 2

| Event Semantics with the Addition of Repeated Events | | |
|---|---|---|
| Element or Attribute Name | Use | Description |
| Event | | specifies an Event and contains the message of the event. The content of this element depends on the event scheme. The contents shall be either: A string, optionally encoded as specified by @contentEncoding XML content using elements external to the MPD namespace For new event schemes string content should be used, making use of Base 64 encoding if needed. NOTE The schema allows "mixed" content within this element however only string data or XML elements are permitted by the above options, not a combination. |
| @presentationTime | OD default: 0 | specifies the presentation time of the event relative to the start of the Period taking into account the @presentationTimeOffset of the Event Stream, if present. The value of the presentation time in seconds is the division of the value of this attribute and the value of the @timescale attribute. If not present, the value of the presentation time is 0. |
| @duration | O | specifies the presentation duration of the Event. The value of the duration in seconds is the division of the value of this attribute and the value of the @timescale attribute. The interpretation of the value of this attribute is defined by the scheme owner. If not present, the value of the duration is unknown. |
| @id | O | specifies an identifier for this instance of the event. Events with equivalent content and attribute values in the Event element shall have the same value for this attribute. The scope of the @id for each Event is with the same @schemeIdURI and @value pair. |
| @status | O default: none | specifies the status of event: none: no specific status update: the event is an update of an earlier event with identical values of @schemeIdUr, @value, and @id repeat: the event is a repeat of an earlier event with identical values of @schemeIdUr, @value, and @id, and is expected to be dispatched to the application, even if the earlier event was already delivered. |
| @contentEncoding | O | specifies whether the information in the body and the information in the @messageData is encoded. If present, the following value is possible: base64 the content is encoded as described in IETF RFC 4648 prior to adding it to the field. If this attribute is present, the DASH Client is expected to decode the message data and only provide the decoded message to the application. |
| @messageData | O | specifies the value for the event stream element. The value space and semantics must be defined by the owners of the scheme identified in the @schemeIdUri attribute. NOTE the use of the message data is discouraged by content authors, it is only |

TABLE 2-continued

Event Semantics with the Addition of Repeated Events

| Element or Attribute Name | Use | Description |
| --- | --- | --- |
| | | maintained for the purpose of backward-compatibility. Including the message in the Event element is recommended in preference to using this attribute. This attribute is expected to be deprecated in the future editions of this document. |

Key

For attributes: M = mandatory, O = optional, OD = optional with default value, CM = conditionally mandatory For elements: <minOccurs> . . . <maxOccurs> (N = unbounded)

Elements are bold; attributes are non-bold and preceded with an @.

According to embodiments, an Event with @status='repeat' is the repeated instance of an earlier event with identical @schemeIdUri, @value, and @id attributes that may have been previously processed by the DASH client. The DASH client is expected to dispatch this event instance even if the earlier event with the updated instance even if the previous event has already been dispatched. Such features represent syntax and semantics for repeated events according to embodiments.

And for inband repeated events the flags field in emsg box is, according to embodiments, specified as follows: (flags & 2) equal to 1 indicates that the esmg is a repeat of another esmg with identical values of scheme_id_uri, value and id fields.

An emsg box with flags & 2=1 is the repeated instance of an emsg box with identical scheme_id_uri, value, and id fields that may have been previously processed by the DASH client. The DASH client is expected to dispatch this event even if the previous event has already been dispatched yet.

And for a processing model for repeated event, embodiments, extend the DASH client event processing model to process the repeated event properly. Improved processing models are described also as follows.

Assuming the application is subscribed to a specific event stream identified by a (scheme/value) pair with a specific dispatch_mode, either on-start or on-receive, as described in DASH subclause A.13.7 or the like, the processing model varies depending on the value of dispatch_mode.

The example 900 of FIG. 9 illustrates a common process according to embodiments herein where the DASH Client implements the following process. At S901, for dispatch_mode on state, the DASH Client sets up a Pending Event Table (PET), at S902, for each subscribed scheme_uri/(value) in the case of dispatch_mode=on_start. The PET maintains a single list of event ids that are waiting to be dispatched. The DASH Client also sets up, at S903, a Dispatched Event Table (DET) for each subscribed scheme_uri/(value). The DET maintains a single list of 'emsg' ids that have been dispatched according to embodiments.

At S904, parse the 'emsg'/timed metadata sample and retrieve scheme_uri/(value) is implemented, and at S905, if Application is not subscribed to the scheme_uri/(value) pair, end the processing of this 'emsg'. At S906, there is also derive the event instance/metadata sample's ST, and at S907, there is also derive the ending time ET=ST+DU.

Event Presentation/Start Time (ST) which is the moment in the media timeline that the Event becomes active. ST is the moment in the media timeline that the Event becomes active. This value can be calculated using the parameters included in the DashEventMessageBox. Event duration (DU): the duration for which the Event is active. DU is signaled in the Event Message box using a specific value. And ET is an event time according to embodiments.

Figure 10:
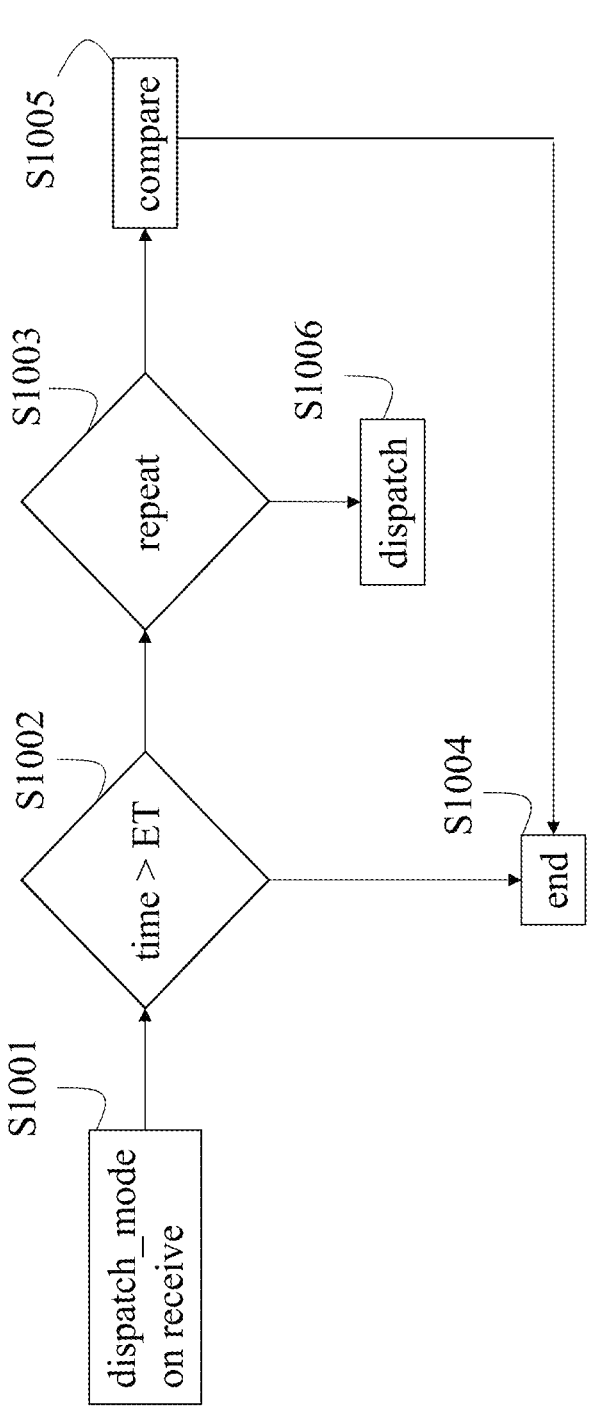
FIG. 10 is a simplified flow diagram in accordance with embodiments.

FIG. 10 shows an example 1000 for on-receive processing according to exemplary embodiments, where, at S1001, the DASH Client implements the following process when dispatch_mode=on_receive. At S1002, if the current presentation time value is greater than ET, then end processing at S1004, and otherwise, at S1003, in the case of event, if the event is a repeat of another event, then see S1006, but otherwise, at S1005, compare the event's id with the entries of the DET of the same scheme_uri/(value) pair such that If an entry with the identical id value exists, end processing at S1004. Otherwise, at S1006, dispatch the event/timed metadata, including ST, id, DU, timescale, and message_data as described in DASH subclause A.13.6, and add the event to the DET.

Figure 11:
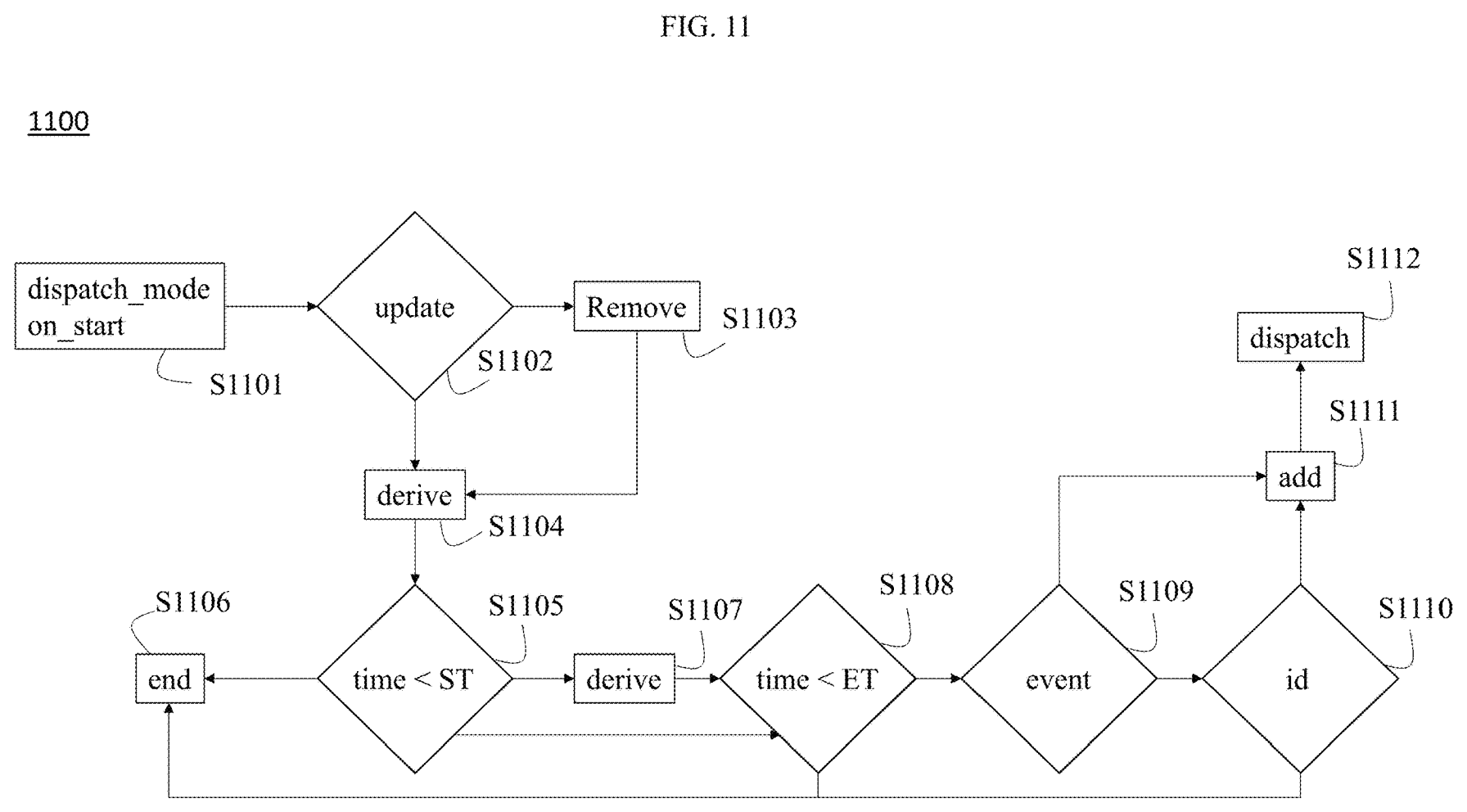

And FIG. 11 shows an example 11100 for on-start processing according to exemplary embodiments, where at S1101, The DASH Client implements the following process when dispatch_mode=on_start. At S1102, if the event is an update of a previous event (signalled through @status or emsg flags), remove, at S1103, any existing event, if any, with identical scheme_uri/(value) and id, which is not a repeat event, from the PET. At S1104, derive the event instance/metadata sample's ST. And at S1105, if the current media presentation time value is smaller than ST, then go to S1108. And at S1107, derive the ending time ET=ST+DU. And at S1108, if the current presentation time value is greater than ET, then end the processing at S1106. But, at S1109, in the case of event, if the event is a repeat event, then go to S1111. But otherwise, at S1110, compare the event's id with the entries of the PET of the same scheme_uri/(value) pair, and if an entry with the identical id value exists, end the processing at S1106. But, if not, then, at S1111, add 'emsg''s id to the corresponding PET, and, at S1112, dispatch the event/metadata message_data at time ST, or immediately if the current presentation time is larger than ST, as described in DASH subclause A.13.6, remove the event, if any exists, from the PET and add it to the DET.

Therefore, there is provided a method of defining a plurality of repeated DASH events, each DASH repeat event comprises an event in response to a corresponding identifier value being the same, and each DASH repeat event provides the same information of a previous DASH event, and a DASH client processing model dispatches a repeated DASH event after the DASH client processing model has dispatched the previous DASH event previously, and in response to the DASH client has not dispatched but is scheduled to dispatch the previous DASH event, the DASH client processing model dispatches both the previous DASH event and the repeated DASH event at a respective time for which each of the previous DASH event and the repeated DASH event is scheduled. And the identifier value may include one or more of a scheme, a value, and an identifier.

Therefore, embodiments provided herein provide a precise definition for repeated events, and extend the DASH client event processing model to monitor repeated events and dispatch them properly.

The techniques described above, can be implemented as computer software using computer-readable instructions and physically stored in one or more computer-readable media or by a specifically configured one or more hardware processors. For example, FIG. 12 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
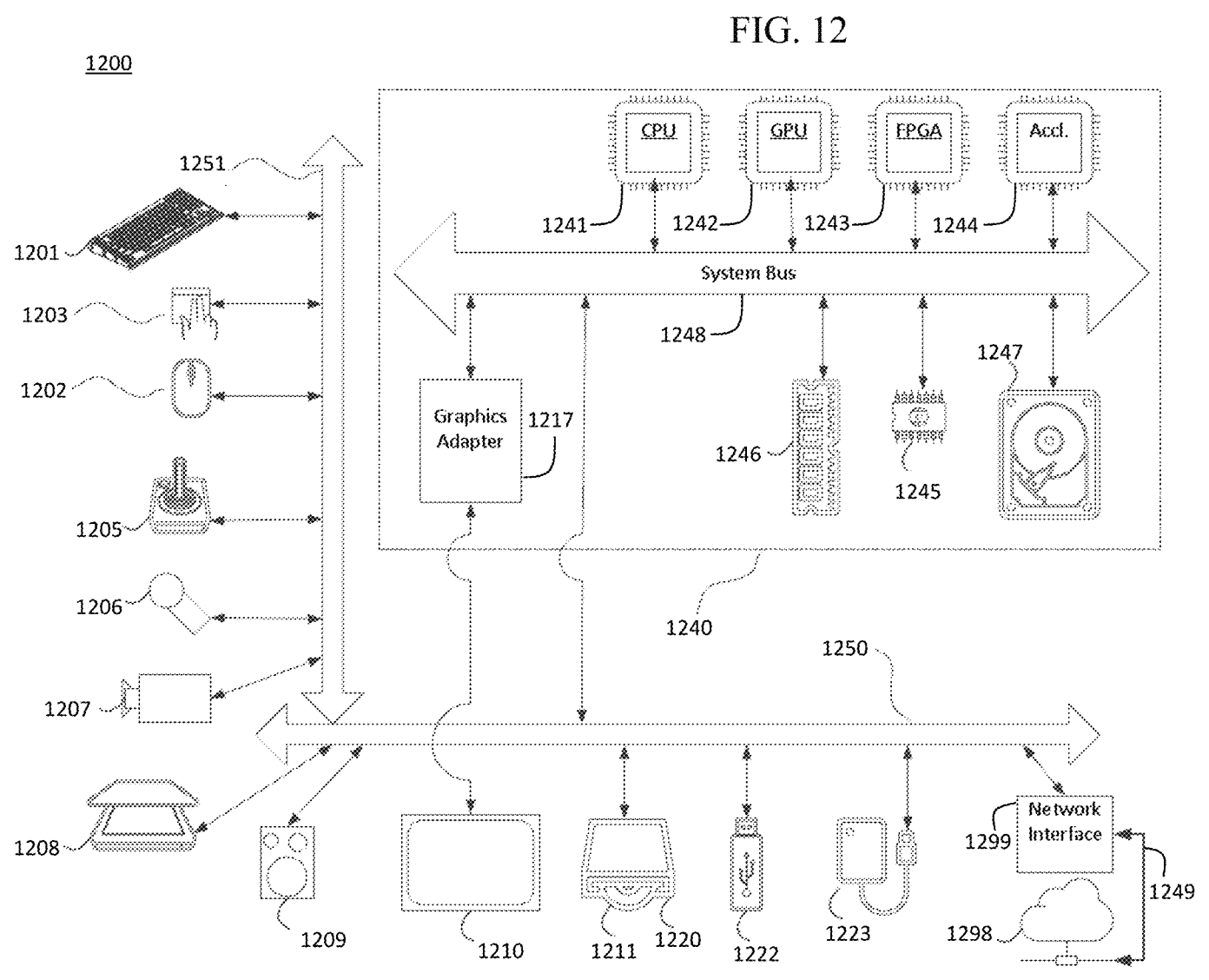

The components shown in FIG. 12 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, joystick 1205, microphone 1206, scanner 1208, camera 1207.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, or joystick 1205, but there can also be tactile feedback devices that do not serve as input devices), audio output devices (such as: speakers 1209, headphones (not depicted)), visual output devices (such as screens 1210 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD 1211 or the like media, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface 1299 to one or more communication networks 1298. Networks 1298 can for example be wireless, wireline, optical. Networks 1298 can further be local, wide-area, metropolitan, vehicular and industrial, real-time, delay-tolerant, and so on. Examples of networks 1298 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1298 commonly require external network interface adapters that attached to certain general-purpose data ports or peripheral buses (1250 and 1251) (such as, for example USB ports of the computer system 1200; others are commonly integrated into the core of the computer system 1200 by attachment to a system bus as described below (for example Ethernet interface into a PC computer system or cellular network interface into a smartphone computer system). Using any of these networks 1298, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1240 of the computer system 1200.

The core 1240 can include one or more Central Processing Units (CPU) 1241, Graphics Processing Units (GPU) 1242, a graphics adapter 1217, specialized programmable processing units in the form of Field Programmable Gate Areas (FPGA) 1243, hardware accelerators for certain tasks 1244, and so forth. These devices, along with Read-only memory (ROM) 1245, Random-access memory 1246, internal mass storage such as internal non-user accessible hard drives, SSDs, and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1251. Architectures for a peripheral bus include PCI, USB, and the like.

CPUs 1241, GPUs 1242, FPGAs 1243, and accelerators 1244 can execute certain instructions that, in combination, can make up the aforementioned computer code. That computer code can be stored in ROM 1245 or RAM 1246.

Transitional data can be also be stored in RAM 1246, whereas permanent data can be stored for example, in the internal mass storage 1247. Fast storage and retrieval to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method, performed by at least one processor of a dynamic adaptive streaming over hypertext transfer protocol (HTTP) (DASH) client, comprising:
obtaining identifier values of a plurality of events of a media file in DASH;
determining whether ones of the identifier values of the plurality of events comprise a same value;
dispatching, from the DASH client and to a DASH application, a first DASH event of the plurality of events, wherein dispatching the first DASH event comprises also dispatching together the first DASH event and a second DASH event of the plurality of events based on determining that the second DASH event is scheduled to be dispatched and comprises the same value as the first DASH event, and dispatching the first DASH event together with the second DASH event comprises dispatching the second DASH event with at least one of a syntax @status=repeat" and an emsg box with a flag syntax of "& 2=1"; and
controlling the DASH application based on dispatching at least the first DASH event and the second DASH event.

2. The method according to claim 1,
wherein the same value comprises at least one of a scheme and an identifier in DASH.

3. The method according to claim 1,
wherein the syntax "@status=repeat" is provided by the DASH client as an indication of a media presentation description (MPD) repeated event.

4. The method according to claim 1,
wherein dispatching the first DASH event together with the second DASH event comprises dispatching the second DASH event with the emsg box with the flag syntax of "& 2=1" is provided by the DASH client as an indication of an inband repeated event.

5. The method according to claim 4,
wherein the same value is at least a "scheme_id_uri" syntax.

6. An apparatus for a dynamic adaptive streaming over hypertext transfer protocol (HTTP) (DASH) client, the apparatus comprising:
at least one memory configured to store computer program code;
at least one processor configured to access the computer program code and operate as instructed by the computer program code, the computer program code including:
obtaining code configured to cause the at least one processor to obtain identifier values of a plurality of events of a media file in DASH;
determining code configured to cause the at least one processor to determine whether ones of the identifier values of the plurality of events comprise a same value;
dispatching code configured to cause the at least one processor to dispatch, from the DASH client and to a DASH application, a first DASH event of the plurality of events, wherein dispatching the first DASH event comprises also dispatching together the first DASH event and a second DASH event of the plurality of events based on determining that the second DASH event is scheduled to be dispatched and comprises the same value as the first DASH event, and dispatching the first DASH event together with the second DASH event comprises dispatching the second DASH event with at least one of a syntax "@status=repeat" and an emsg box with a flag syntax of "& 2=1"; and
controlling code configured to cause the at least one processor to control the DASH application based on dispatching at least the first DASH event and the second DASH event.

7. The apparatus according to claim 6,
wherein the same value comprises at least one of a scheme and an identifier in DASH.

8. The apparatus according to claim 6,
wherein the syntax "@status=repeat" is provided by the DASH client as an indication of a media presentation description (MPD) repeated event.

9. The apparatus according to claim 6, wherein dispatching the first DASH event together with the second DASH event comprises dispatching the second DASH event with the emsg box with the flag syntax of "& 2=1" is provided by the DASH client as an indication of an inband repeated event.

10. The apparatus according to claim 9, wherein the same value is at least a "scheme_id_uri" syntax.

11. A non-transitory computer readable medium storing a program of a dynamic adaptive streaming over hypertext transfer protocol (HTTP) (DASH) client causing a computer to execute a process, the process comprising:

obtaining identifier values of a plurality of events of a media file in DASH;

determining whether ones of the identifier values of the plurality of events comprise a same value;

dispatching, from the DASH client and to a DASH application, a first DASH event of the plurality of events, wherein dispatching the first DASH event comprises also dispatching together the first DASH event and a second DASH event of the plurality of events based on determining that the second DASH event is scheduled to be dispatched and comprises the same value as the first DASH event, and dispatching the first DASH event together with the second DASH event comprises dispatching the second DASH event with at least one of a syntax "@status-repeat" and an emsg box with a flag syntax of "& 2=1"; and controlling the DASH application based on dispatching at least the first DASH event and the second DASH event.

12. The non-transitory computer readable medium according to claim 11, wherein the same value comprises at least one of a scheme and an identifier in DASH.

13. The non-transitory computer readable medium according to claim 11, wherein the syntax "@status=repeat" is provided by the DASH client as an indication of a media presentation description (MPD) repeated event.

14. The non-transitory computer readable medium according to claim 11, wherein dispatching the first DASH event together with the second DASH event comprises dispatching the second DASH event with the emsg box with the flag syntax of "& 2=1" is provided by the DASH client as an indication of an inband repeated event, and wherein the same value is at least a "scheme_id_uri" syntax.

* * * * *